United States Patent
Brown et al.

[11] Patent Number: 5,810,902
[45] Date of Patent: Sep. 22, 1998

[54] METHOD AND APPARATUS FOR MAKING AIR PRODUCTS

[75] Inventors: Jimmy Gene Brown; Michael Terricks McKibben, both of Defiance; Edward Lee Hite, Toledo; Kenneth Andrew Clocksin, Grand Rapids, all of Ohio

[73] Assignee: Johns Manville International, Inc., Denver, Colo.

[21] Appl. No.: 754,714

[22] Filed: Nov. 21, 1996

Related U.S. Application Data

[63] Continuation of Ser. No. 329,368, Oct. 26, 1994, abandoned.

[51] Int. Cl.⁶ .................................................. C03B 37/06
[52] U.S. Cl. ........................... 65/447; 65/464; 65/25.1; 65/27; 134/22.12; 134/22.18; 264/121; 264/169; 406/193; 406/86
[58] Field of Search .......................... 65/376, 447, 454, 65/464, 465, 25.1, 27; 134/22.12, 22.18; 406/193, 88, 86; 264/121, 169

[56] References Cited

U.S. PATENT DOCUMENTS

| | | | |
|---|---|---|---|
| 2,317,895 | 4/1943 | Drill | 65/464 |
| 2,319,666 | 5/1943 | Drill | 65/464 |
| 3,237,812 | 3/1966 | Kenp | 406/91 |
| 4,135,767 | 1/1979 | Hench | 406/88 |
| 4,289,807 | 9/1981 | Christensen | 264/121 |
| 4,508,474 | 4/1985 | Fredrick | 406/88 |
| 4,666,487 | 5/1987 | Gerault | 65/27 |
| 4,969,942 | 11/1990 | Schwenninger | 65/27 |
| 5,051,123 | 9/1991 | Nurmi | 65/25.1 |
| 5,252,007 | 10/1993 | Klinzing | 406/193 |
| 5,409,521 | 4/1995 | Featherstone | 75/334 |
| 5,478,173 | 12/1995 | Lenhart | 406/88 |

*Primary Examiner*—John Hoffmann
*Attorney, Agent, or Firm*—Robert D. Touslee

[57] ABSTRACT

In a process of making gas laid products by entraining particles including fibers at least partially coated with a binder in a gaseous stream, passing the stream through a forming chamber and through a permeable collecting surface where the particles including fibers build up to form a product like fiber glass insulation, this invention prevents particles including fibers from contacting and building up on the walls of the forming chamber and causing wet spots in the finished product by maintaining a high velocity, high pressure layer of gas close to the exposed surface of the walls of the chamber and moving in the general direction of the gaseous stream. This is accomplished by apparatus including a plurality of plenum boxes forming the walls of the forming chamber with the surface exposed to the gaseous stream having gas directing openings therein.

25 Claims, 8 Drawing Sheets

METHOD AND APPARATUS FOR MAKING AIR PRODUCTS

This is a continuation of application Ser. No. 08/329,368, filed Oct. 26, 1994, entitled METHOD AND APPARATUS FOR MAKING AIR LAID PRODUCTS, now abandoned.

FIELD OF THE INVENTION

This invention relates to processes that involve containment of airborne particles, such as fibers, enroute to being collected into a mat or blanket, particularly where the particles are wet and/or are at least partially coated with a tacky binder and, apparatus for use in these processes. In a preferred embodiment, the invention pertains to apparatus and an improved process for making fiber glass insulation products.

BACKGROUND

In gas, air laid processes for making particulate paper, mat, blanket, board, etc., particles such as fibers are carried in an air stream that is contained and guided by at least a partial enclosure to a permeable collecting surface or screen where the particles are laid down on the collecting surface while the entraining air stream is sucked through the permeable collecting screen. Such a process is used to make fibrous insulation products such as glass fiber insulation bats, blankets, boards, etc. as disclosed in U.S. Pat. Nos. 4,832,723; 4,058,386; 3,901,675; 3,759,680; 3,250,602; 3,030,659 and 2,431,205, the disclosures of which are hereby incorporated by reference.

These processes usually involve spraying water and/or a binder onto the particles while they are airborne in route to collection. This causes the particles to become sticky or tacky, particularly when the entraining air is warm or hot, which is frequently the case. Contains walls containing or guiding the sticky air entrained fibers, the forming chamber, cause a problem because the fibers get blown into contact with the walls and many stick and then catch other particles and build up on the walls. Once these build-ups reach a certain size, portions of each build-up, clumps, break loose due to the air stream rushing past, are picked up by the air stream and carried to the collection screen where they are deposited on the mat, often near one of its edges, but also across the mat. These clumps are often wetter than the rest of the blanket having collected water and binder droplets from the air stream due to their residence time on the walls. The clumps also cause thick areas on the blanket or mat. The thicker areas and the wetter clumps prevent total drying and curing of the binder resin, usually phenolic resin, in the oven later in the process resulting in wet spots in the finished product requiring much otherwise good product to be scrapped.

Also, it is necessary to shut the process down frequently, every six weeks or sooner, and clean the walls and bottom of the forming chamber to reduce the frequency of wet spots. Every shut down is costly.

In the past, things have been done to try to prevent clumps from forming on the forming chamber walls. For example, it has been proposed to use a large conveyor belt for each wall such that each wall is slowly moving. In this way build-ups on the walls are continuously carried out of the forming chamber where, in the return path, the belt, or moving wall, can be continuously cleaned without having to shut the process down. While this system is an improvement, the system is very costly to install and operate and the process material losses are still high because all material that sticks to the walls is carried out, removed in the cleaning step and discarded.

Another way of keeping the sidewalls clean is to continuously wash the walls with a sheet of moving water while the process is operating. This eliminates most of the wet spots from occurring, but the water usage and water cleanup or disposal costs are very high. Further, the process material losses are very high because all particles that contact the moving sheets of water are picked up and carried out of the process with the water.

This problem is becoming more costly and difficult to abide as the regulations on the disposal of wastes becomes more stringent. The need for a process that avoids dirty walls in the forming chamber is thus great. Also, there is a need for improved efficiency in the binder application step since all binder that does not end up on the parties/fibers is removed in the air stream and must be removed by costly filtering, scrubbing and water treatment techniques.

SUMMARY OF THE INVENTION

The present invention solves the above described problems, which have been long experience and have cost the industry very heavily. In the present invention, a layer of high velocity gas, such air is introduced through a multiplicity of openings in at least one of the confining walls of the forming chamber in a manner to flow generally parallel to the walls in the direction of the particle entraining air stream causing a layer of high velocity pressure air to exist next to or adjacent to the walls which effectively prevents at least most of the particles from contacting and/or sticking to the walls, thus eliminating or greatly reducing wet spots and substantially increasing process up-time and process material efficiency. The costly waste disposal problems of the past associated with the cleaning of dirty forming chamber walls are almost entirely eliminated.

Another embodiment of the present invention uses the high velocity, high pressure air layer concept in a down stream portion of the forming tube to allow the area of the exit end of the forming tube to be greatly increased, slowing the velocity of the particle entraining air stream as it passes through the binder application zone which increases the binder application effectiveness and binder material efficiency. A still further improvement is the application of the binder spray from underneath the entraining air stream instead or in addition to the prior method of spraying downwardly on the entraining air stream.

DETAILED DESCRIPTION OF THE INVENTION

Figure 1:
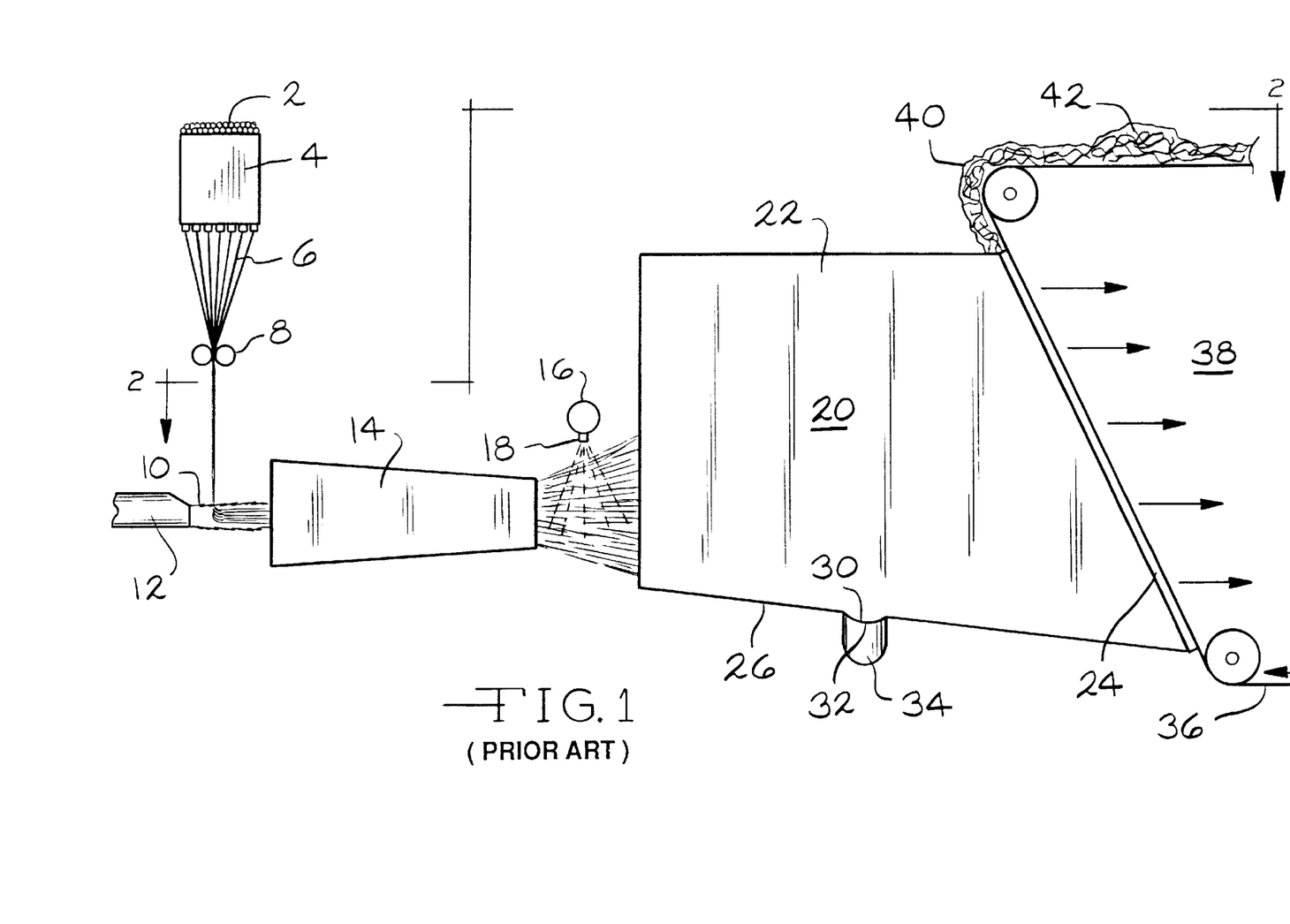
FIG. 1 is a side view of a portion of a prior art fiber glass insulation manufacturing system.

FIG. 1 is a vertical cross section of a portion of a well known system for making fiber glass insulation. Glass marbles 2 are melted in an electrically or gas heated bushing 4 and formed into primary fibers 6 after the molten glass flows through a multiplicity of holes in the bottom of the bushing 4. The primary fibers 6 are gathered into a long row of fibers and pulled by roller assembly 8 below the bushing 4 such that the row of primary fibers are fed to a hot gaseous blast 10 emitted from an air-gas burner 12. As the primary fibers 6 enter the hot blast 10 they are quickly remelted and attenuated into fine insulation fibers having an average fiber diameter typically of 6–7 microns. The hot gaseous blast 10 attenuates and then breaks the fibers into various lengths as the blast enters and passes through a forming tube 14 that tapers downwardly in height and width from its entrance end to exit end. As the high velocity gaseous stream and the entrained fibers exit the forming tube 14, they pass through a cooling water spray and binder spray supplied by one or more spray headers 16 with a plurality of nozzles 18 along the length of the header 16. The headers 16 are located above or on the sides of the fiber entraining air stream. Water hitting the fibers cools the fibers so that when the binder droplets strike the fibers the binder, which is usually a phenol formaldehyde with or without modifiers, extenders and other resins, but can also be urea formaldehyde based or other well known binders, will not be dried and prematurely cured. However, since the air stream is still hot or very warm, the binder coated fibers do rapidly become tacky as they are carried on into a forming chamber 20.

The forming chamber 20 comprises opposed sidewalls 22, side seals 24 and a bottom 26. The bottom 26 contains a drain running entirely across its width about half way down the length of the bottom 26, which drain comprises a depressed portion 30 having one or more rows of holes 32 therein to catch water and binder that falls out of the entraining air stream onto the front portion of the bottom 26 and deliver it into a drain pipe 34 that transports the liquid to a waste treatment system. The side seals 24 are preferably made with oak wood about 2 inches thick with 2–5 inches of wood between the sidewalls 22 and a collection chain 36. The side seals form a seal between the sidewalls 22 and the moving collection screen (chain) 36.

An enclosure (not shown) around the collection chain 36 and a large suction fan (also not shown), communicating with space 38 behind the chain 36 and within the enclosure, pulls the entraining air stream through the chain 36 depositing the entrained fibers onto the surface of the moving chain 36 to form a mat or blanket 40 of intertangled tacky fibers. A thicker portion 42 of the blanket is caused by a clump of fiber that built up on one of the sidewalls 22 of the forming chamber and broke loose, being carried and deposited on the collected blanket 40 by the entraining air stream. This thick, and usually wetter than normal, portion 42 will not dry thoroughly and cure in the oven (now shown) downstream and will result in a wet spot in the finished product causing that product to be scrapped, or if it should escape detection, causing even greater cost in the form of a customer problem. Even through the wet spot may be only a few inches or less in diameter, it causes a lot of scrap because the product it occurs in is typically more than a foot in width and several feet long. Because of the frequency of wet spots and the problems they cause if not detected and scrapped, this problem introduces another substantial cost in the form of increased inspection.

Figure 2:
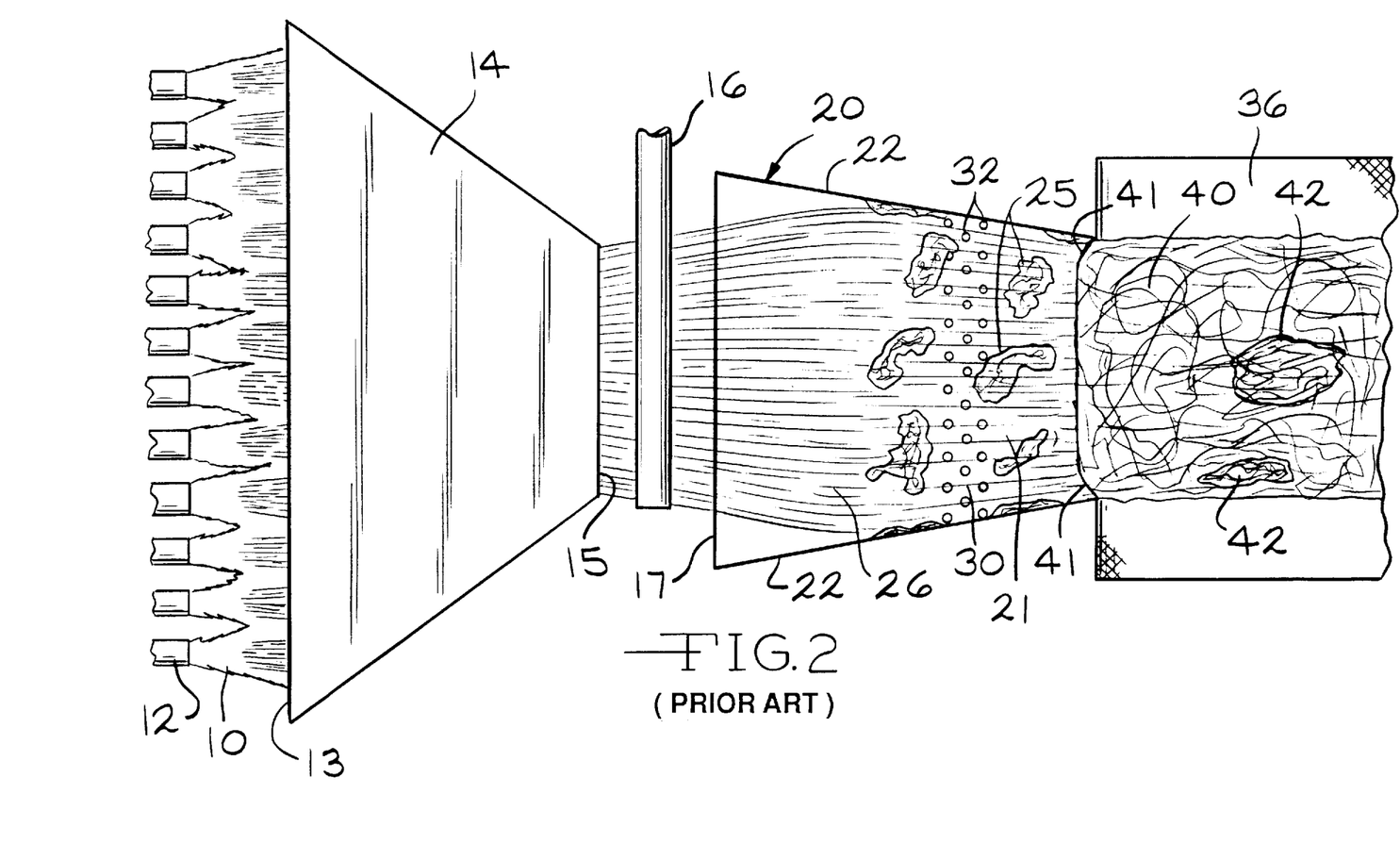
FIG. 2 is a plan view of a portion of the system shown in FIG. 1.

FIG. 2 is a plan view of the prior art system shown in FIG. 1 and shows how the fibers build up in the forming chamber 20 to cause clumps leading to higher density, wet spots in the product. The entrance end 13 of the forming tube 14 is much wider than the exit end 15 to allow more fiberizing units to be used to increase productivity. Thus as the air stream carrying the fibers moves through the forming tube 14, the pressure increases in the stream even though the temperature drops rapidly as the stream exits the forming tube and enters the cooling water spray and binder spray supplied by one or more spray manifolds 16 located above the stream.

The entrance end 17 of the forming chamber 20 is wider than the exit end 15 of the forming tube 14 to allow for expansion of the entraining air stream and entrained fibers. The bottom 26 of the forming chamber 20 slants downwardly slightly towards the collection screen 36 and is modified part way along its length with a depressed portion 30 that runs completely across its width. Holes 32 in the depressed region drain off water and binder that fall out of the stream and collect on the upstream portion of the bottom 26 and run into the depressed portion 30 to prevent this fallout from running down onto the downstream portion 21 of the bottom 26 which would aggravate buildup further. The top of the forming chamber 20 is open.

The sidewalls 22 of the forming chamber 20 taper or deckle inwardly from the entrance end 17 to the side seals 24 and the collection screen 36 to conform to the desired collection width. This taper aggravates fibers striking the sidewalls 22 causing build-ups 23 and also striking a downstream portion 21 bottom 26 and causing build-ups 25 there. The build-up problem becomes worse as the sidewalls 22 are deckled in further to collect a narrower blanket, which is dictated by the width of the finished product and the desire to deep edge trim scrap to a minimum.

As the blanket 40 is collected on the collection screen 36 the edges of the blanket 41 are tapered and are of a lower density due to lower velocity of the entraining airstream next to the sidewalls 22 due to wall drag and build-up 23. The tapered and low density edges 41 of the blanket 40 must be trimmed off of the cured product leading to more scrap caused or aggravated by the build-ups 23. As mentioned above, when the build-ups 23 and 25 reach a certain size they are broken loose by the rapidly moving airstream and carried by the airstream to the collection chain 36 causing thicker and usually wetter areas 42 in the blanket that will result in high density wet spots in the finished product.

Figure 3:
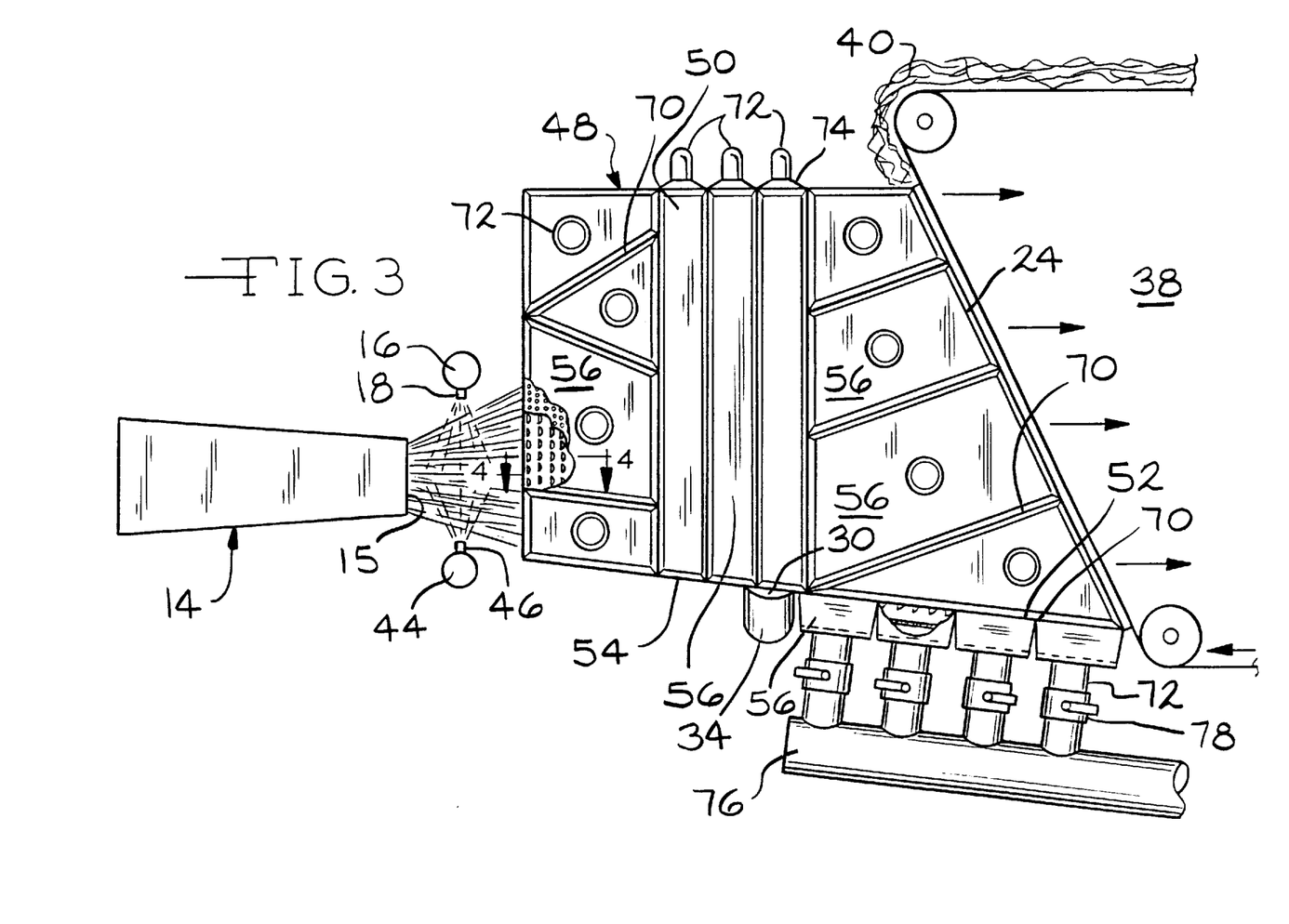
FIG. 3 is a side view of a portion of the fiber glass manufacturing system shown in FIGS. 1 and 2, but modified by a preferred embodiment of the present invention in the forming chamber of the system.

FIG. 3, a side view of the same system shown in FIGS. 1 and 2, but with a forming chamber 48 modified according to the present invention to eliminate or minimize the problems of the previous forming chambers described above. The sidewalls 50 and the downstream portion 52 of the bottom 54 are made according to the present invention while the remainder of the forming chamber 48 remains unchanged from that described earlier. The sidewalls 50 and the downstream portion 52 of the bottom 54 are made up from a plurality of plenum boxes 56 of various shapes, one combination of shapes being shown in FIG. 3. Construction of the plenum boxes is shown in detail in FIG. 7 and FIG. 7A.

Each box 56, regardless of the shape of the side exposed to the entraining airstream, includes a sidewall segment 57 having an exposed surface 58 and having a plurality of fluid directing openings 60 therein, said directing openings being oriented to direct a fluid along the exposed surface 58 of said sidewall 50, generally in the direction of movement of the entraining airstream as the latter passes through the forming chamber 48. By "generally in the direction" is meant within about 45 degrees, and preferably within about 30 degrees and most preferably within about 15 degrees of the actual direction of the flow of the entraining stream. Each plenum segment 56 also has sides or separators 62 attached in a sealed manner to the sidewall segment 57 and to each other at corners 64 and also to a back plate 66. The back plate 66 is slightly smaller in length and width than that of the sidewall segment 57 such that the sides 62 make an angle slightly less than 90 degrees with the inside surface of sidewall segment 57 and an angle slightly more than 90 degrees with the inside surface of the back plate 66, e.g. about 88 and 92 degrees respectively (see FIG. 7A). With this construction, the only edges of the plenum segments 56 touching each other when the boxes 56 and bolted together on a frame will be the edges 68 exposed to the entraining airstream, thus insuring tight seams 70 in the sidewalls 50 and bottom 52 between the segments 56.

Figure 7:
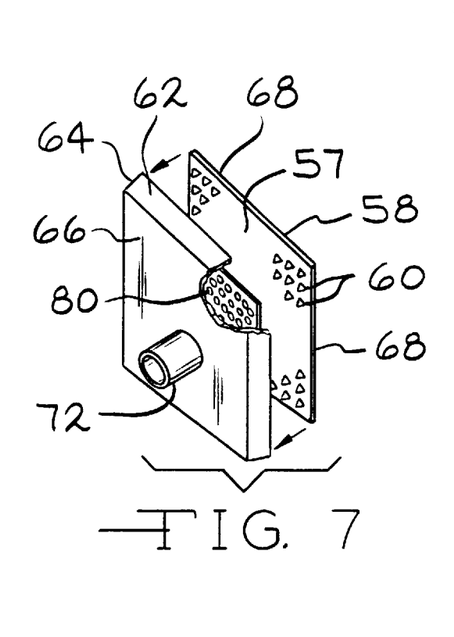
FIG. 7 is an exploded prospective view of one portion of a forming chamber wall shown in FIG. 3 having a portion cut away to show the construction of the preferred wall of the present invention.
Figure 7A:
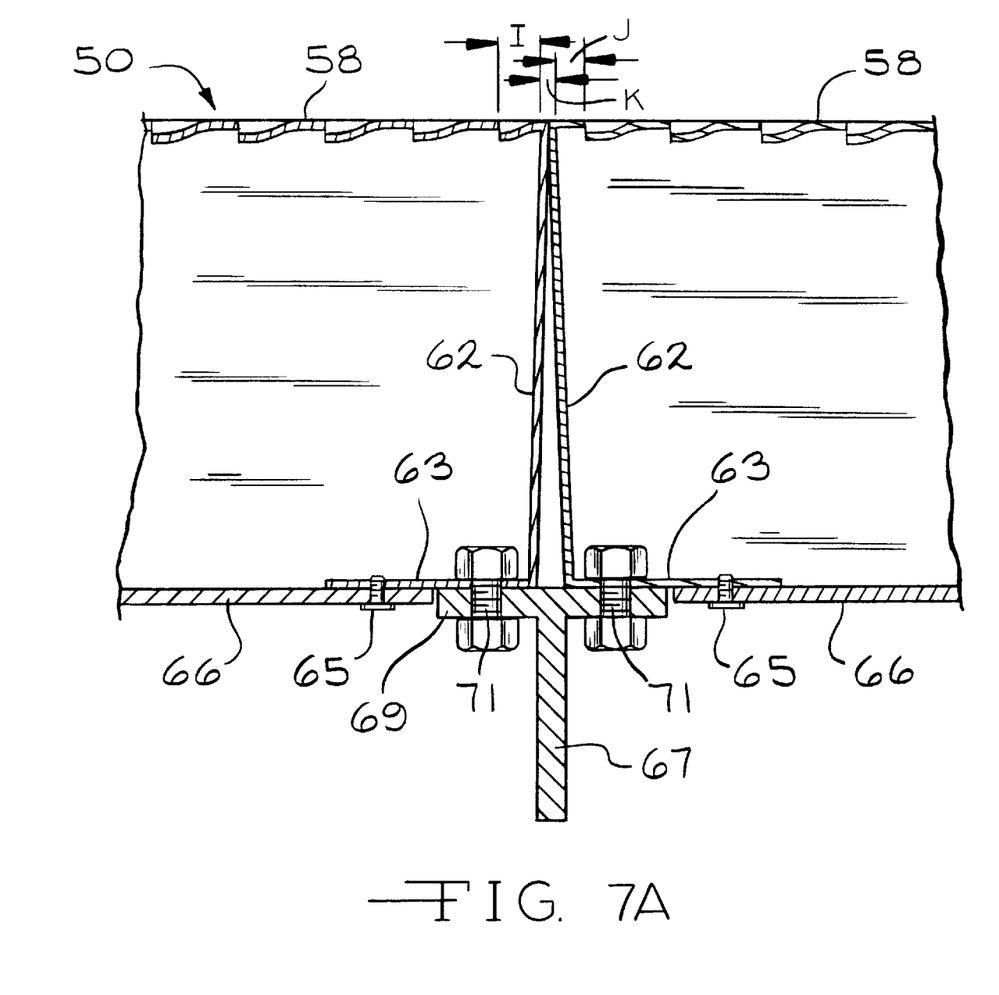
FIG. 7A is a partial plan view of two plenum boxes showing details of a preferred embodiment and showing how the boxes mount together on a frame.

FIG. 7A shows a preferred manner of constructing and mounting the plenum boxes 56. The sides 62 bend 90 degrees at the back towards the interior of the box 56 and extend for 1–3 inches or more to form a flange 63 that extends entirely around on the inside of the box 56. The back plate 66 is then bolted onto this flange in a sealed manner with screws 65. This allows any back plate to be removed to get to the interior of a box 56 to clean or change the distributor 80 (see FIG. 7) in the interior of the box, even while the process is running if necessary.

Each box 56 can be mounted in place by a number of different techniques, but FIG. 7A shows a preferred mounting method. A frame (not shown) is constructed of metal beams in a known manner. T bar stock 67 is welded to this frame in the appropriate places to coincide with the joints 70 between the boxes 56 on their backside. Webs 69 of the T bars face the flanges 63 of the boxes. Holes are drilled through the webs 69 and through the flanges 63 in the appropriate places such that the boxes 56 can be bolted onto the T bars 67 with bolts 71 through these holes.

At least one fluid or air duct connector 72 enters either the back plate 66 or one or more of the separators 62 (see FIG. 3). Since these connectors 72 are preferably at least about 6 inches in diameter it is necessary to use a round to rectangular section 74 when entering the box 56 through a separator 62 since the boxes 56 are preferably only about 4 inches in depth, but can be shallower so long as uniform air flow to the segment 57 is maintained, and can be deeper, but to no significant advantage. All or at least several of the fluid or air duct connectors 72 are connected to an air manifold 76, preferably with a flow control valve 78 (see FIG. 3) in the line to each box 56 so the fluid flow to each box can be adjusted independently of each other or shut off to do maintenance.

Referring again to FIG. 7, it is preferred especially when air is to enter the box 56 through the back plate 66, to install a distributor plate 80 across the box parallel with the exposed surface 58 and spaced about one inch from the back plate 66. The distributor plate 80 can be a screen or perforated plate having, for example, about 50 percent open area and holes about one sixteenth of an inch in diameter, but any known means for providing a reasonably uniform air flow rate to each of the openings 60 with a plenum segment 56 will be suitable.

The shape and size of the segments 56 are preferably selected to keep the area of the exposed surface 58 of each segment 56 to below about 1025 square inches, but this limit can be extended if higher pressure air fans are used. The shape and arrangement of the segments 57 are such that when the boxes 56 are fastened in place, none of the seams 70 are generally parallel with the direction of flow of the entraining air stream. When the latter suggestion is not followed there will be gaps in the layer of high velocity, high pressure air layer adjacent the exposed surface of the sidewall 50 or bottom 52 that might let build-up start unless substantially higher air pressures are maintained in the boxes 56 during operation than is otherwise necessary.

Almost any reasonable material can be used to make the plenum segments 56, but a stainless steel such as 304 is preferred when using the invention on a glass fiber insulation manufacturing system because of the durability stainless steel offers. Carbon steel can be used on less exposed parts like the distributors 80, the duct connectors 72, the valves 78, etc. The segments 57 and sides 62 and flanges 63 are preferably constructed of 14 or 16 gauge stainless while the back plates 66 are made from 11 gauge stainless.

Figure 4:
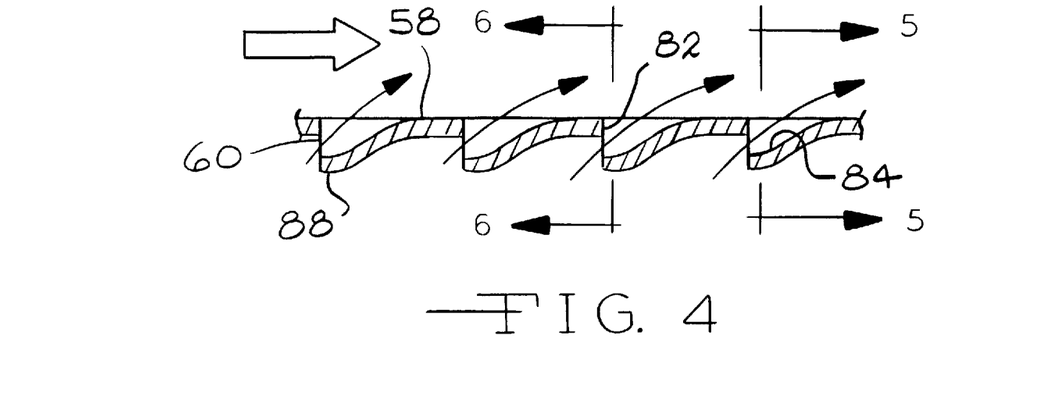
FIG. 4 is a cross section of a portion of the forming chamber wall of FIG. 3 taken at lines 4—4 showing the nature of the openings in the chamber wall.
Figure 5:
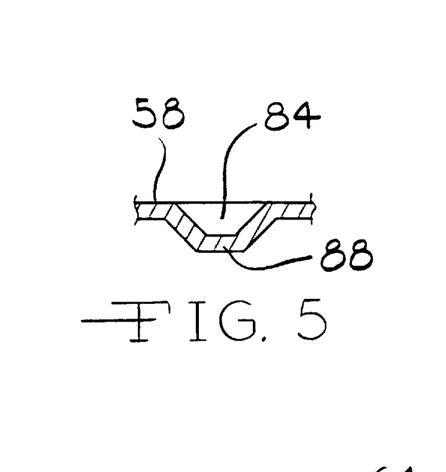
FIG. 5 is a cross section of the portion of the wall shown in FIG. 4 taken along lines 5—5.
Figure 6:
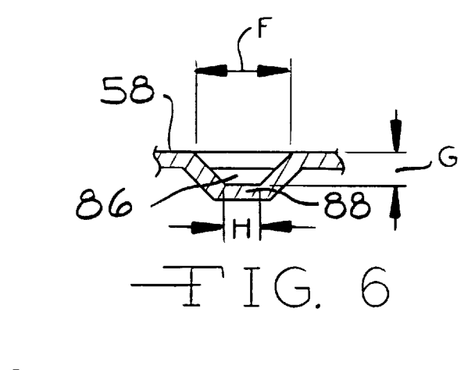
FIG. 6 is a cross section of the portion of the wall shown in FIG. 4 taken along lines 6—6.

The design of the openings 60 in the exposed sidewall segment 57 is critical in that they must all direct the fluid in approximately the same direction and at a low angle with the exposed surface 58. FIGS. 4–6 show details of a preferred 14 gauge 304 stainless steel configuration for sidewall and bottom wall segments 57. Slots 82 about five eights or eleven sixteenths of an inch wide are first made in the stainless steel sheet, as shown in FIG. 4A, on 1.75 inch centers side to side (dimension B) and in rows that are 0.8333 inch apart (dimension A), with each row of slots being staggered with respect to each adjacent row of slots such that looking along the direction of flow, slots 82 align in every third row.

Figure 4A:
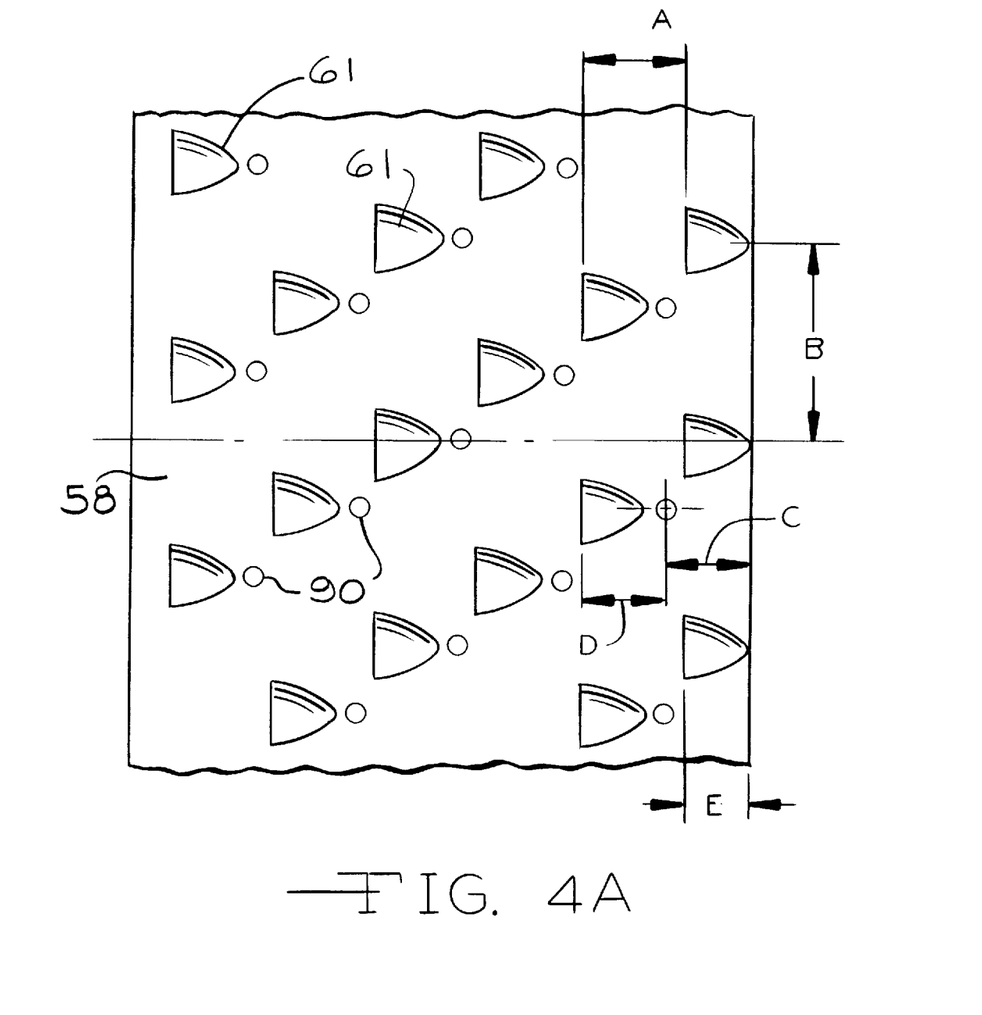
FIG. 4A is a cross section of a portion of the forming chamber wall of FIG. 3 taken at lines 4—4 showing the nature of the openings in the chamber wall of a preferred embodiment of the invention.

Next an area adjacent to and extending about 0.416 inch down stream of each slot (dimension E) is deformed, preferably away from the surface that is to be the exposed surface 58 as shown in FIGS. 4, 4A and 7A such that the exposed surface 58 will be smooth with slight depressions louvers 61, but no projections. The area is deformed with a tapered die such that the maximum deformation on one part of surface 58 away from the non-deformed, adjacent portion of surface 58 is about two or three thirty-seconds of an inch next to the slot 82 and then tapering to the surface 58 at the opposite end of the deformation 61 to form a ramp 84. The width of the deformation 61 is the length of the slot 82 in the plane of surface 58 next to the slot 84 and tapers to approximately nothing at the opposite end. The length of the deformed edge 88 of the slot 82 can be longer than the length of the slot due to stretching of the metal during deformation. The area of each of the depressions 61 disclosed above is about 0.000196 square feet and there is about one depression for every square inch of exposed surface 58.

The cross section of the deformation is shown in FIGS. 5 and 6 to be angular, but it can be an arc, triangular, semi-elliptical or semi-oval in shape. Ramps 84 made by the deformation should make a low angle, of less than 45 degrees, and preferably in the range of about 22–45 degrees, with surface 58 so that the air flowing through openings 86 and up ramps 84 will stay close to surface 58, at least until the next approximately in-line slot 82 is reached.

To get additional lift, if desired, a small round hole 90 (see FIG. 4A), such as about three sixteenths of an inch in diameter, can be drilled in segment 57 downstream of the end of each depression 61. The centerline of the hole 90 should be about 0.60 inch from a line joining the ends of the next downstream row of depressions 61 (dimension C) and about 0.6493 inch from the next upstream slot 82 (dimension D).

Other configurations of directed openings 60 and depressions 61 of louvered sheet can be used so long as the above described requirements are met. For example, a material called Conidur™ perforated sheets, available from Hein Lehmann AG of Dusseldorf, Germany, can be used. In this latter material the openings are much smaller and closer together than in the preferred embodiment described above.

In sizing and making the deformations in each segment 57, it is preferred to arrange the depressions 61 close to the edges of segment 57 as shown in FIG. 7A. Preferably, dimension 1 is about 0.4165 inch, dimension J is about 0.2915 inch and dimension K is about 0.125 inch.

When using light weight louvered sheets up to about 16 gauge, the louvered sheets can be stiffened with stiffener bars like three sixteenths inch by three quarter inch bar stock tack welded to the inside surface of segments 57 opposite surface 58, preferably between the rows of louvers 61. When the louvers 61 are smaller and closer together than the preferred example disclosed above, the stiffeners are then placed across louvers in the appropriate places needed stiffening and tack welded.

In the operation of the embodiment shown in FIGS. 37–7A, air, filtered to remove any particles or fibers that could plug holes in the distributor 80 or louvers 61, is supplied to each plenum box from a high pressure fan capable of achieving about 20 inches water column or higher pressure using the flow valves to regulate to achieve a flow velocity adjacent to each side or bottom wall segment that is at least equal to, and preferably exceeding, the velocity of the entraining air stream at that location. This will achieve a layer of air adjacent to the exposed surface 58 of the sidewalls 50 and the bottom wall 52 moving at least about 6,000 FPM at a location within about one inch of the exposed surface 58, which eliminates or at least greatly reduces buildup and wet spots and scrap. Some segments 56 may not require this much air flow, while others may need more for optimization of operation—the flow control valves 78 permit such adjustment. It is also advantageous to install pressure taps and pressure gauges for measuring the pressure in the zone between the distributor plate 80 and the side or bottom wall segment 57. This enhances optimization of build-up and air usage and permits rapid product changes— different products will require different air flow rates for optimization, at least in some of the plenum segments 56.

Typically, pressures of 1–8 inches of water column are maintained in the plenum boxes 56 downstream of the distributor 80, usually about 2–6 inches WC. Under some circumstances it may be necessary to run some boxes at a pressure above 8 inches WC.

Using the system of this invention, the cost of the air usage is far less than the cost of water and the dirty water treatment when using the water cleaned sidewalls of the prior art and also lower than the cost of operating moving sidewalls—the process losses are also lower. Another advantage of the above described invention is reduced edge trip scrap. Because the build-up problem is almost entirely eliminated and because the high velocity air stream next to the sidewalls drag is eliminated, the density of the edges of the resultant blanket are not significantly lower than the remainder of blanket and the taper experienced in the old process is greatly diminished. This means much less of the edges must be trimmed off thus reducing edge trim scrap and contributing to the substantially higher material efficiency produced by this invention.

FIG. 3 also shows an improved binder application system in accordance with the present invention. This system involves locating one or more binder spray manifolds 44, having a plurality of spray nozzles 46 located along its length, beneath and running perpendicular to the direction of flow of the entraining airstream in the area between the exit end 15 of forming tube 14 and the entrance end of forming chamber 48. Compared to the previous method of spraying the binder down through or across through the entraining air stream and entrained fibers, the invention of spraying the binder up through the stream is much more binder material efficient, i.e. more of the binder ends up on the fibers than the other conventional techniques. This is because the binder particles that fail to strike a fiber as they pass through the stream, unlike those in the other techniques, get a second chance as they fall back down into and through the airstream due to gravity.

Figure 8:
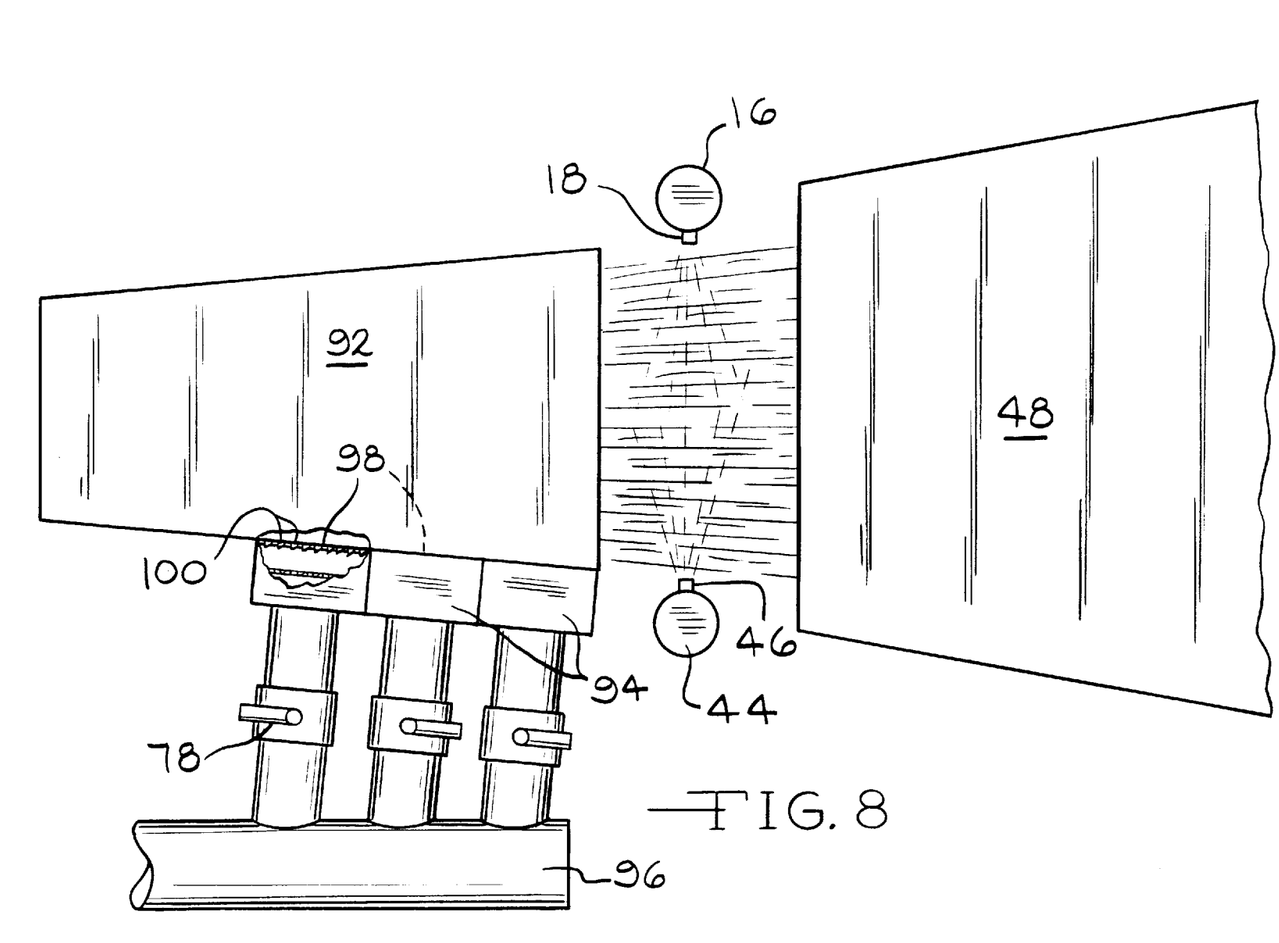
FIG. 8 is a vertical cross section of a portion of the system shown in FIGS. 1 and 2, but modified with other embodiments of the present invention to improve binder and collection efficiency.

FIG. 8 shows another embodiment of the inventions described above. Shown in FIG. 8 is a cross section of a portion of the system shown in FIGS. 1–7, but extending the use of the panels shown in FIG. 7 into a forming tube 92 which allows modification of the forming tube to slow down the velocity of the fibers as they exit the forming tube. By using one or more plenum boxes 94, having the same construction as shown in FIG. 7, in the bottom of the down stream end of the forming tube 92 it is no longer necessary to taper the height of the forming tube from the entrance end to the exit end to keep the entraining stream high enough to prevent fibers from settling onto the bottom of the forming tube. With plenum box(es) 94, in place the forming tube can be modified to make the height of the exit end larger than the height of the entrance end to slow the velocity of the particles as they pass through the binder application sprays. This allows for more cooling time and more efficient binder application. Any fibers that try to settle to the bottom of the forming tube are moved along by the high velocity, high pressure air layer produced by the air flowing through the directed openings 98 in the exposed surface 100 of plenum boxes 94.

Figure 9:
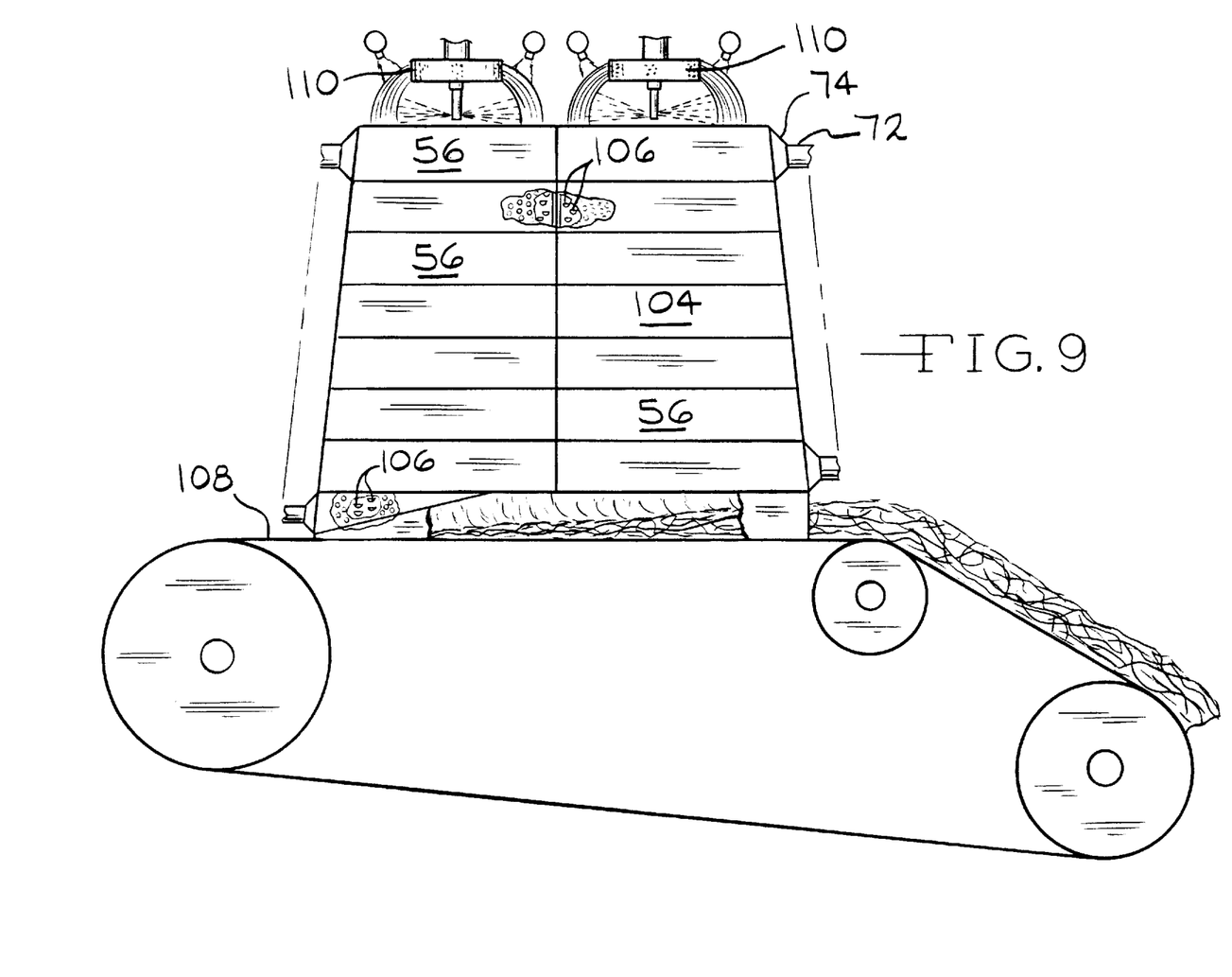
FIG. 9 is a vertical cross section of a portion of a rotary fiberizing fiber glass manufacturing system with the forming chamber modified in accordance with the present invention.

FIG. 9 shows the use of the above described invention on two or more walls of a forming chamber 104 of a typical rotary fiber insulation manufacturing system of the type disclosed in U.S. Pat. Nos. 4,058,386; 3,444,028; 3,759,680 and 3,865,566, the latter being a rotary process, but having a collection system something like that disclosed in FIGS. 1–2 above. The disclosures in these patents are hereby incorporated herein by reference. These processes suffer the same fiber build-up problems on the walls of the forming chamber in varying degrees as the process disclosed in FIGS. 1 and 2. In this application of the invention the directed openings 106 are oriented to direct the high velocity, high pressure layer of air vertically downward towards a collection belt 108. In this process one or more spinner assemblies 110 which form and attenuate the fiber and spray the binder onto the fiber in a number of ways including from below the spinner as disclosed in U.S. Pat. No. 4,832,723, the disclosure of which is hereby incorporated herein by reference. In this application of the invention it may not be necessary to extend the air layer producing panels all the way to the top of the forming chamber walls.

Other embodiments and modifications of the above described invention will be apparent to those of ordinary skill in the art and as such are intended to be covered by the claims attached hereto. For example, it is not necessary to build the plenum boxes disclosed as separate and distinct units and then hold them in place by attaching their back plates to a frame using bolts, welds, etc. The exposed surface 50, 52, and 100 can be one continuous sheet of metal with no seems having directed openings 60 or 98 oriented in the proper direction. In this case the separators or sides of the segments are welded onto the backside of said sheet, the distributors are installed, the back plates are welded onto the separators or sides and the resulting integrated unit is then fastened into place as a single unit.

The above described invention can be used in any process that involves moving particles through an area having at least one confining wall, particularly when the particles are to be at least partially coated with water and or binder that makes the particles tacky prior to being collected on a permeable surface to form a product. Such processes include, in addition to the fiber insulation processes, paper making by the dry process, making cereal and other food products, non-woven mats and fabric making by air laid processes.

We claim:

1. A process of forming a product comprising causing an entraining gaseous stream to flow at a velocity and in a direction, said gaseous stream containing fibers having wet or tacky surfaces entrained therein, through a forming chamber having at least one confining wall exposed to the entraining gaseous stream, and on through a permeable collecting surface to collect and form a mat or blanket of the fibers on said collecting surface and thereafter drying said mat or blanket, the improvement comprising introducing a gas through a multiplicity of openings in the at least one confining wall of said forming chamber and on into said forming chamber in a manner to flow generally in the direction of flow of the entraining gaseous stream and at a velocity equal to or exceeding the velocity of the entraining gaseous stream, said gas entering said forming chamber through said multiplicity of openings and passing up ramps depressed in the at least one confining wall, each of said openings being adjacent to one of said ramps and each of said ramps ending at an exposed surface of the at least one confining wall, said surface being exposed to said entraining gaseous stream, each of said ramps making an angle with said exposed surface that is less than 45 degrees, thus causing a layer of said gas to exist inside said forming chamber adjacent to said exposed surface, said layer having sufficient pressure and velocity to prevent at least most of said fibers from sticking to said exposed surface.

2. The process of claim 1 wherein the gas introduced through said openings is air and wherein said at least one confining wall includes sidewalls.

3. The process of claim 1 wherein the process is a process for making glass fiber products, wherein a binder is applied to the glass fibers making the surfaces of said fibers tacky and wherein said at least one confining wall includes sidewalls.

4. The process of claim 3 wherein the gas introduced through said openings is air.

5. The process of claim 3 wherein said forming chamber also has a bottom, at least a portion of said bottom having a multiplicity of openings therein and wherein the gas is also introduced through said multiplicity of openings in said at least a portion of said bottom.

6. The process of claim 3 wherein the velocity of the gas introduced through said openings and in said layer, within one inch of said exposed surface, is at least 6000 feet per minute.

7. The process of claim 3 wherein the gas introduced through said openings is introduced using a plurality of plenum segments with seams therebetween and wherein none of the seams between said segments is generally parallel to the direction of flow of said entraining gaseous stream.

8. The process of claim 7 wherein said depressed ramps are uniformly spaced in the exposed surface of said sidewalls interior surfaces of said plenum segments exposed to said entraining there being about one depressed ramp per square inch of said exposed surface.

9. The process of claim 8 wherein said gas is air and air is also passed through holes is said sidewalls, said holes being approximately perpendicular to the direction of flow of said gaseous stream, said holes being located such that one of said holes is slightly downstream of a termination of said depressed ramp associated with each opening.

10. The process of claim 9 wherein each of said openings is 2–3 thirty-seconds of an inch high and about 10–11 sixteenths of an inch wide at a greatest width, opening is a louver having a ramp extending from a lower edge of said opening to an interior surface of the wall containing said said angle is about 22 to 45 degrees and air pressure is maintained upstream of said openings at a level above one inch water column.

11. The process of claim 8 wherein each of said openings is 2–3 thirty-seconds of an inch high and about 10–11 sixteenths of an inch wide at a greatest width, opening is a louver having a ramp extending from a lower edge of said opening to an interior surface of the wall containing said said angle is about 22 to 45 degrees and air pressure is maintained upstream of said openings at a level above one inch water column.

12. The process of claim 8 wherein the glass fibers are formed by a rotary fiberizing process wherein molten glass, by centrifugal force, flows through holes in a wall of a spinning container to form fibers which are then entrained in said gaseous stream before the binder is applied, and are then moved through the forming chamber to said collecting surface while entrained in said gaseous stream.

13. The process of claim 12 wherein said fibers move downwardly through said forming chamber.

14. The process of claim 3 wherein said gaseous stream entraining said glass fibers passes through a forming tube having a bottom before passing into said forming chamber and wherein a gas is introduced through bottom openings in the bottom of said forming tube in a manner to flow at a higher velocity than said velocity of said entraining gaseous stream, said bottom openings being adjacent to depressed ramps in the bottom of said forming tube, one end of each of the depressed ramps being at a surface of the bottom exposed to said gaseous stream, said gas being introduced up said ramps and into said forming tube, the angle said ramps make with said exposed surface of said bottom being less than 45 degrees to form a layer of the gas adjacent said exposed surface of said bottom of said forming tube that prevents said fibers from settling onto the bottom of said forming tube.

15. The process of claim 1 wherein the velocity of the gas introduced through said openings and in said layer, within one inch of said exposed surface, is at least 6000 feet per minute.

16. The process of claim 1 wherein the fibers are formed by a rotary fiberizing process wherein a molten material, by centrifugal force, flows through holes in a wall of a spinning container to form fibers which are then entrained in said gaseous stream and are then moved through the forming chamber to said collecting surface while entrained in said gaseous stream, wherein said gas is introduced through said multiplicity of openings using a plurality of plenum segments with seams therebetween, wherein none of the seams between said segments is generally parallel to the direction of flow of said entraining gaseous stream, and wherein said gas is also introduced into said forming chamber through holes in said at least one confining wall, each hole spaced from one end of each ramp, said end being at said exposed surface, said depressed ramps being uniformly spaced over said surface such that there is one of said ramps per square inch of said exposed surface.

17. A process for forming a product comprising causing an entraining gaseous stream to flow at a velocity and in a direction, said gaseous stream containing particles having wet or tacky surfaces entrained therein, through a forming chamber having at least one confining wall exposed to the entraining gaseous stream, and on through a permeable collecting surface to collect and form a mat or blanket of said particles on said collecting surface and thereafter drying said mat or blanket, the improvement comprising introducing a gas through a multiplicity of openings in at least one confining wall of said forming chamber and on into said forming chamber in a manner to flow at a velocity equal to or exceeding the velocity of the entraining gaseous stream, said gas entering said forming chamber through each of said openings and passing up depressed ramps, each ramp being adjacent to one of said multiplicity of openings and ending at an exposed surface of the at least one confining wall, said exposed surface being exposed to said entraining gaseous stream, said ramps making an angle with said exposed surface that is less than 45 degrees, and said gas flowing generally in said direction of flow of the particle entraining gaseous stream, thus causing a layer of said gas to exist inside said forming chamber adjacent to said exposed surface, said layer having sufficient pressure and velocity to prevent at least most of said particles from sticking to said exposed surface.

18. The process of claim 17 wherein said gas is air.

19. The process of claim 18 wherein the velocity of said air introduced through said multiplicity of openings in said at least one confining wall is such that after said air enters said forming chamber and remains within one inch of said exposed surface, said air has a velocity that is higher than the velocity of said entraining gaseous stream just beyond one inch of said exposed surface.

20. The process of claim 19 wherein the velocity of said air within one inch of said wall is at least about 6000 FPM.

21. The process of claim 17 wherein said forming chamber also has a bottom and said gas is also passed through openings in at least a downstream portion of the bottom.

22. The process of claim 17 wherein said gas is introduced using a plurality of plenum segments with seams therebetween and wherein none of the seams between said segments is generally parallel to the direction of flow of said entraining gaseous stream.

23. The process of claims wherein the depressed ramps are uniformly spaced over said exposed surface exposed to said entraining gaseous stream, there being about one of the depressed ramps per square inch of said exposed surface.

24. The process of claim 23 be wherein air is also introduced into the forming chamber through holes in said exposed surface of said at least one confining wall, said holes being approximately perpendicular to the direction of flow of said gaseous stream, said holes being located such that each hole is slightly downstream of a termination of one of said ramps.

25. The process of claim 23 wherein each of said openings is 2–3 thirty-seconds of an inch high and about 10–11 sixteenths of an inch wide at a greatest width, each of said ramps makes an angle with said exposed surface of about 22 to 45 degrees and air pressure is maintained upstream of said openings at a level about one inch water column.

* * * * *